(12) United States Patent
Gamaroff et al.

(10) Patent No.: US 11,416,832 B2
(45) Date of Patent: Aug. 16, 2022

(54) SYSTEMS AND METHODS FOR BLOCKCHAIN-DEPENDENT OPERATION SETS

(71) Applicant: nChain Holdings Limited, St. John's (AG)

(72) Inventors: Lorien Benjamin Gamaroff, Johannesburg (ZA); Angus James Farquharson Campbell Brown, Johannesburg (ZA)

(73) Assignee: nChain Holdings Limited, St. John's (AG)

( * ) Notice: Subject to any disclaimer, the term of this patent is extended or adjusted under 35 U.S.C. 154(b) by 0 days.

(21) Appl. No.: 16/632,305

(22) PCT Filed: Jul. 7, 2018

(86) PCT No.: PCT/IB2018/055281
§ 371 (c)(1),
(2) Date: Jan. 17, 2020

(87) PCT Pub. No.: WO2019/016693
PCT Pub. Date: Jan. 24, 2019

(65) Prior Publication Data
US 2020/0167741 A1    May 28, 2020

(30) Foreign Application Priority Data
Jul. 18, 2017    (ZA) .................... 2017/04853

(51) Int. Cl.
*G06Q 20/06*    (2012.01)
*G06F 16/27*    (2019.01)
(Continued)

(52) U.S. Cl.
CPC .......... *G06Q 20/065* (2013.01); *G06F 16/27* (2019.01); *G06Q 20/20* (2013.01)

(58) Field of Classification Search
CPC ...... G06Q 20/065; G06Q 20/20; G06F 16/27; G06F 21/64; H04L 63/12; H04L 2209/56; H04L 9/3239; H04L 2209/38
(Continued)

(56) References Cited

U.S. PATENT DOCUMENTS

2015/0262137 A1* 9/2015 Armstrong ............. G06Q 40/04
705/41
2015/0278820 A1 10/2015 Meadows
(Continued)

OTHER PUBLICATIONS

European Extended Search Report dated Feb. 18, 2021, Patent Application No. 18835118.3, 9 pages.
(Continued)

*Primary Examiner* — Garcia Ade
(74) *Attorney, Agent, or Firm* — Davis Wright Tremaine LLP

(57) ABSTRACT

Systems and methods for performing a plurality of operations, in which at least one operation comprises a blockchain transaction, are described. A request to perform a plurality of operations is received, where the operations comprise a blockchain transaction and a second transaction of a type other than a block chain transaction. A conversion factor is obtained from a service and a blockchain transaction is recorded based on the conversion factor. The recorded blockchain transaction comprises an amount of a digital asset (e.g., Bitcoin) based on the conversion factor, a generated blockchain address, and an interstitial change address. The second transaction is performed as a result of the blockchain transaction having been validated.

20 Claims, 6 Drawing Sheets

(51) Int. Cl.
  *G06Q 20/20* (2012.01)
  *G06Q 40/04* (2012.01)
(58) Field of Classification Search
  USPC .......................................................... 705/16
  See application file for complete search history.

(56) References Cited

U.S. PATENT DOCUMENTS

| | | |
|---|---|---|
| 2016/0321654 A1 | 11/2016 | Lesavich et al. |
| 2016/0342977 A1 | 11/2016 | Lam |
| 2016/0342989 A1 | 11/2016 | Davis |
| 2016/0371771 A1 | 12/2016 | Serrano et al. |
| 2017/0221029 A1* | 8/2017 | Lund .................... G06Q 50/188 |

OTHER PUBLICATIONS

International Search Report and Written Opinion for Application No. PCT/IB2018/55281, dated Dec. 20, 2018, 4 pages.

\* cited by examiner

SYSTEMS AND METHODS FOR BLOCKCHAIN-DEPENDENT OPERATION SETS

FIELD OF INVENTION

This present disclosure relates generally to systems and methods for performing sets of operations including at least one distributed ledger transaction, and in which additional operations, involving other transaction types, are dependent on the distributed ledger transaction. The present disclosure is particularly suited, but not limited to, use in exchanging mixed asset types.

CROSS-REFERENCE TO RELATED APPLICATIONS

This application claims the benefit of South African Provisional Application No. 2017/04853, filed Jul. 18, 2017.

BACKGROUND OF INVENTION

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing, etc.) while being more versatile in their applications.

SUMMARY OF INVENTION

The present disclosure provides methods, systems, and computer program products as defined in the appended claims.

In accordance with the disclosure, there may be provided a computer-implemented method comprising receiving a request to initiate a plurality of operations, the request comprising a first value and an identifier of a first entity, the plurality of operations comprising a blockchain transaction and a second transaction of a type different from the blockchain transaction; generating a blockchain address to be temporarily associated with the identifier in a data store; obtaining, from a service, a conversion factor to convert the first value to a second value to be used in the blockchain transaction; causing the blockchain transaction to be recorded in a blockchain, wherein the blockchain transaction uses the generated blockchain address and an interstitial change address; validating the blockchain transaction; and as a result of the blockchain transaction having been validated, causing the second transaction to be processed based at least in part on the first value.

Use of a blockchain, i.e. a distributed ledger, in the method may provide a number of advantages, including the provision of an efficient authorization mechanism for operations dependent on the first transaction. This may be due, in part, to a verification mechanism that is more readily determined to be irrevocable than other transaction types.

Use of an interstitial change address may also provide a number of advantages. For example, the interstitial change address may be created without waiting for confirmation, permitting the operations to proceed efficiently. Moreover, the use of an interstitial change address may enable the provision of detailed transaction data to both parties to the transaction, providing assurances to both parties that the transaction is irrevocable, while also preventing the transaction history of the parties from being publicly exposed. The interstitial change address is a blockchain address, and thus inherits attributes of the blockchain such as irrevocability. The use of an interstitial change address may also permit a more rapid determination that the transaction has been entered into the blockchain than other techniques, such as waiting for a block containing the transaction to be mined.

The method may also include sending, as a result of the blockchain transaction having been validated, a notification that a third transaction may proceed. The plurality of operations may include related dependent transactions that may be executed once the first transaction has been determined to be irrevocable. This determination may be made efficiently using the techniques described herein, which in turn always the third transaction to be linked to the prior transaction without the potential for undue delay that may be faced when using other techniques.

The method may also include the identifier of the first entity being obtained from a visual code scanned by a device controlled by a second entity. This may have the advantage of permitting the second entity to initiate the operations in a convenient manner. It also provides a convenient mechanism for the second entity to confirm the identity of the first entity prior to initiating the transaction.

The method may also include the request being transmitted from a point-of-sale device controlled by the first entity. This may be advantageous for a number of reasons, including that it provides a convenient mechanism for the first entity to initiate the operations.

The method may also include the request being transmitted from a point-of-sale device controlled by the first entity in response to an electronic communication from a device controlled by a second entity. This may be advantageous for a number of reasons, including that it provides a convenient mechanism for the second entity to initiate the transaction while also providing notice to the first entity that the operations have been initiated.

The method may also include validating the blockchain transaction by identifying an additional blockchain transaction that assigns change from the blockchain transaction to the interstitial change address. The use of the interstitial change address in this operation allows more efficient confirmation of the blockchain transaction. This has a number of advantages, including making it more feasible to make other transactions dependent on the blockchain transaction, and to allow more rapid notification to the entities that the transaction was successful.

The method may also include publishing the blockchain transaction, and validating the blockchain transaction comprises completion of the publishing. As such, the validation step may be completed by initiating the transaction while acting as or interfacing with a distributed ledger node. In various embodiments, a transaction module may act as or interface with a distributed ledger node to publish the blockchain transaction. By controlling publication of the distributed ledger node, it is possible to determine that a transaction has effectively become irrevocable even prior to the corresponding block having been mined. In particular, it provides assurance that a conflicting digital asset transfer will not be permitted.

The method may also include the generated blockchain address not being used in a blockchain transaction subsequent to performing the plurality of operations. This use of a one-time address improves privacy protections for entities involved in the operations, because the blockchain will not contain further entries directly linking the entities involved in the operation.

The method may also include the plurality of operations comprising an additional blockchain transaction transferring a digital asset from the temporary address to an address provided by the service. This may be performed to effectuate an exchange of digital assets for another asset types. If so, using the provider of the conversion rate to obtain the outgoing transfer address minimizes deviation between the obtained and actual conversion rates. Further, it helps to facilitate an automated, time-bound selection execution of the exchange, which may further minimize deviation risk as well as increase the reliability and availability of the system.

The method may also include selecting the service, from among a plurality of services, based at least in part on the service conforming to at least one of a jurisdictional or geographic criteria. For example, This may also reduce deviation risk as well as increase the reliability and availability of the system.

It is also contemplated to provide a system, comprising at least one process processor; and memory including executable instructions that, as a result of execution by the at least one processor, causes the system to perform any of the methods described above.

It is also contemplated to provide a non-transitory computer-readable storage medium having stored thereon executable instructions that, as a result of execution by one or more processors of a computer system, cause the computer system to at least perform any of the methods as described above.

In accordance with the disclosure, there may be provided a computer-implemented method comprising receiving a request to initiate a plurality of operations, the request comprising information indicative of a first value and an identifier of a first entity, the plurality of operations a first blockchain transaction, a second blockchain transaction, and a third transaction of a type different from the first and second blockchain transactions; obtaining a first conversion factor from a first service associated with a first region; causing the first blockchain transaction to be recorded in a blockchain, wherein the first blockchain transaction is indicative of an incoming transfer of an amount of digital assets based at least in part on the first amount and the first conversion factor; obtaining a second conversion factor from a second service associated with a second region; causing the second blockchain transaction to be recorded in the blockchain, wherein the second blockchain transaction is indicative of an outgoing transfer of the amount of digital assets, wherein the outgoing transfer is in exchange for a second amount of a second asset type, the second amount based at least in part on the amount of digital assets and the second conversion factor; and initiating the third transaction based at least in part on the second amount of the second asset.

The method may also include the third transaction being initiated in response to confirming the first and second blockchain transactions, wherein the confirmation is made without determining that the first and second blockchain transactions are associated with a mined block in the blockchain. This permits the operations to be performed with greater efficiency and overall speed, since the operations are not delayed while waiting for the current block to be mined.

The method may also include the first transaction comprising a generated blockchain address, where the generated blockchain address is not used in a transaction after performing the plurality of operations. This helps protect the privacy of the parties involved in the transaction.

The method may also include the third transaction comprising transferring at least a portion of the second amount of the second asset to a mobile currency account. The use of a mobile currency account provides the recipient entity with a convenient means of utilizing the transferred assets. Moreover, mobile currency accounts may use phone numbers as account identifiers, providing a convenient means of identifying the recipient account.

The method may also include selecting the first and second services based at least in part on conformance of the services to at least one of a jurisdictional or a geographic criteria. This may provide various advantages, including allowing for the identification of a service that is able to conform to local laws and regulations. It may also reduce currency risk and improve accuracy of quoted conversion rates. Moreover, dynamic selection, such as in response to the initiation of the plurality of operations, provides advantages such as minimizing the risk that an obtained conversion rate will deviate from an actual conversion rate, and reduces the risk that the dynamically selected service will be unavailable to participate in an exchange when requested.

The method may also include the information indicative of a first value comprising an identifier of a voucher. In some instances, a first entity may be presented with a voucher held by a second entity. This voucher may be scanned by a mobile device, point-of-sale terminal, or other device in order to obtain a voucher identifier. The identifier may then be transmitted with a request to initiate the plurality of operations. Using the identifier, the recipient of the request can look up, in a database, any parameters relating to the request that were pre-selected or pre-determined.

It is also contemplated to provide a system, comprising at least one process processor; and memory including executable instructions that, as a result of execution by the at least one processor, causes the system to perform any of the methods described above.

It is also contemplated to provide a non-transitory computer-readable storage medium having stored thereon executable instructions that, as a result of execution by one or more processors of a computer system, cause the computer system to at least perform any of the methods as described above.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompany drawings, in which.

DETAILED DESCRIPTION

Systems, methods, and computer program products for performing a plurality of operations, in which at least one of the plurality of operations is a blockchain transaction, and in which one further operation relies on confirmation of the blockchain transaction, will now be described. The disclosed systems, methods, and computer program products may further comprise, in various aspects and embodiments, techniques for confirming the blockchain transaction.

In one example, a computer implemented method is provided for transferring assets between parties using a distributed ledger. In one example, a computer-implemented method is provided for providing a recipient entity with fiat currency (or some other asset type) in exchange for digital assets held by a source entity. Digital assets may refer to assets tied to the blockchain, such as bitcoin or other cryptocurrencies. However, digital assets may, in some instances, refer to other assets types tied to a distributed ledger. The computer-implemented method employs a distributed ledger, and associated infrastructure such as local exchange services, to allow for more convenient utilization of digital assets, including in cases where the recipient entity is not able or willing to receive digital asset transfers.

In another example, a computer-implemented method is provided for exchanging assets in different regions, using a different asset type in each region. One application of this method is to allow a source entity to send fiat currency of a first type to a recipient, who receives fiat currency of a second type. The computer-implemented method leverages a distributed ledger, and associated distributed ledger infrastructure such as local exchange services, to facilitate the exchange.

In another example, a computer-implemented method is provided for executing a series of interdependent operations, in which at least one operation relies on the irrevocability of a prior operation. The method may further comprise relying on the irrevocability being determined within a threshold time period.

Figure 1:
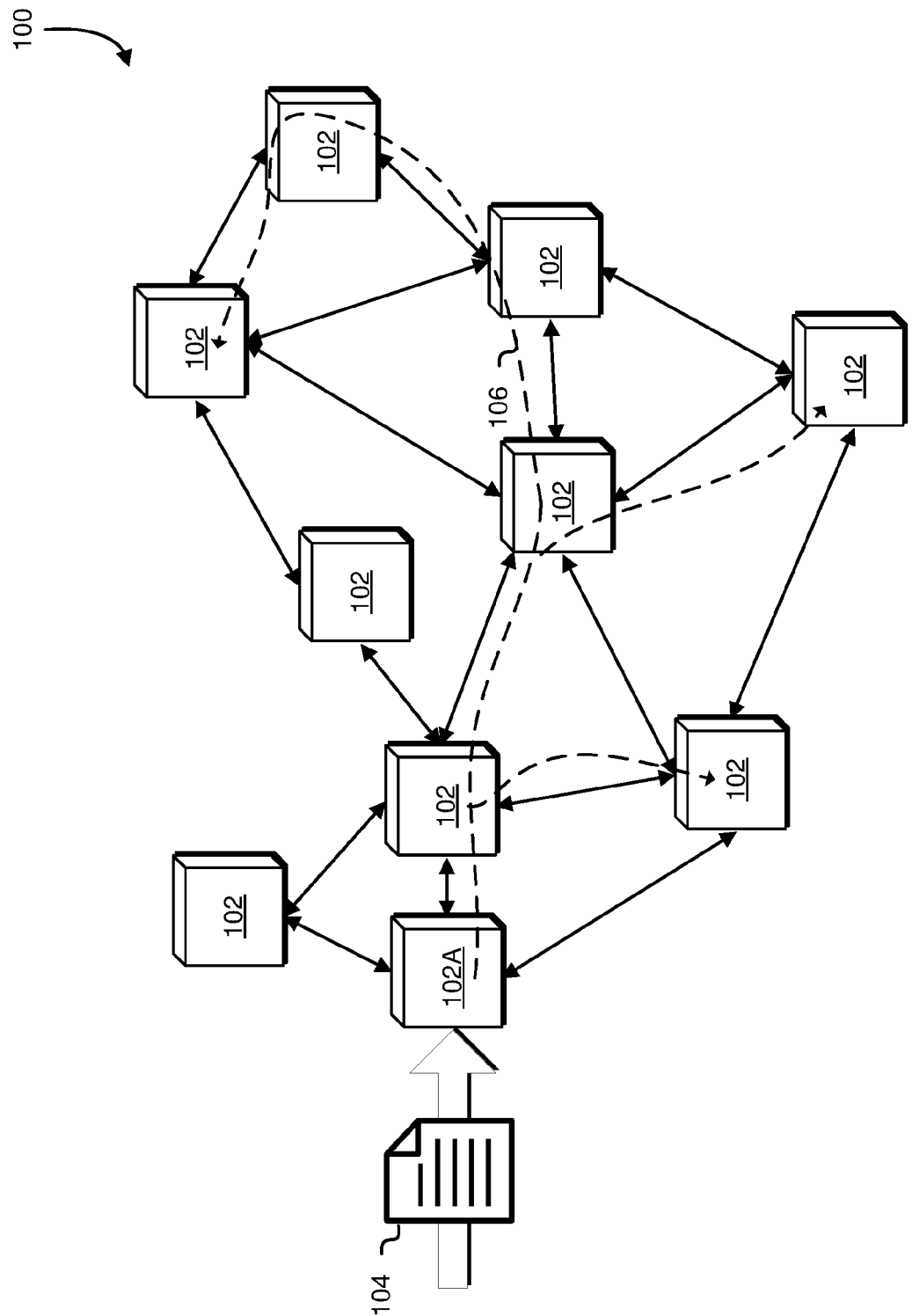
FIG. 1 illustrates a blockchain environment in which various embodiments can be implemented.

Reference will first be made to FIG. 1, which illustrates an example blockchain network 100 associated with a blockchain in accordance with an embodiment of the present disclosure. A blockchain is one example of a distributed ledger, although the two terms are sometimes used interchangeably. As used herein, a distributed ledger refers to a distributed data management system in which multiple computing devices, sometimes referred to as nodes, each maintain their own copy of the ledger. The ledger, typically, comprises records of a series of transactions. No one of the nodes comprises a definitive copy of the ledger. Rather, a record of a transaction recorded by any one of the nodes is distributed to other nodes, which may also record the transaction. A consensus view of the ledger is thereby achieved. Distributed ledgers are also associated with digital assets, such as, for example, a bitcoin. In particular, the digital asset is tied, in various embodiments, to the creation of verifiable blocks with which the ledger transactions are associated.

In the illustrated embodiment, the example blockchain network 100 comprises blockchain nodes that are implemented as peer-to-peer distributed electronic devices, each running an instance of software and/or hardware that performs operations that follow a blockchain protocol that is, at least in part, agreed to among operators of nodes 102. In some examples, "nodes" refers to peer-to-peer electronic devices that are distributed among the blockchain network. An example of a blockchain protocol is the Bitcoin protocol.

In some embodiments, the nodes 102 can be comprised of any suitable computing device (e.g., by a server in a data centre, by a client computing device (e.g., a desktop computer, laptop computer, tablet computer, smartphone, etc.), by multiple computing devices in a distributed system of a computing resource service provider, or by any suitable electronic client device such as a computer. In some embodiments, the nodes 102 have inputs to receive data messages or objects representative of proposed transactions, such as a transaction 104. The nodes, in some embodiments, are be queryable for information they maintain, such as for information of a state of the transaction 104.

As shown in FIG. 1, some of the nodes 102 are communicatively coupled to one or more other of the nodes 102. Such communicative coupling can include one or more of wired or wireless communication. In the embodiment, the nodes 102 each maintain at least a portion of a "ledger" of all transactions in the blockchain. In this manner, the ledger would be a distributed ledger. A transaction processed by a node that affects the ledger is verifiable by one or more of the other nodes such that the integrity of the ledger is maintained.

As for which nodes 102 can communicate with which other nodes, it can be sufficient that each of the nodes in the example blockchain network 100 are able to communicate with one or more other of the nodes 102 such that a message that is passed between nodes can propagate throughout the example blockchain network 100 (or some significant portion of it), assuming that the message is one that the blockchain protocol indicates should be forwarded. One such message might be the publication of a proposed transaction by one of the nodes 102, such as node 102A, which would then propagate along a path such as a path 106. Another such message might be the publication of a new block proposed for inclusion onto a blockchain.

In an embodiment, at least some of the nodes 102 are miner nodes that perform complex calculations, such as solving cryptographic problems. A miner node that solves the cryptographic problem creates a new block for the blockchain and broadcasts the new block to others of the nodes 102. The others of the nodes 102 verify the work of the miner node and, upon verification, accept the block into the blockchain (e.g., by adding it to the distributed ledger of the blockchain). In some examples, a block is a group of transactions, often marked with a timestamp and a "fingerprint" (e.g., a hash) of the previous block. In this manner, each block may become linked to a previous block, thereby creating the "chain" that links the blocks in the blockchain. In embodiments, valid blocks are added to the blockchain by a consensus of the nodes 102. Also in some examples, a blockchain comprises a list of validated blocks.

In an embodiment, at least some of the nodes 102 operate as validating nodes that validate transactions as described in the present disclosure. In some examples, a transaction includes data that provides proof of ownership of a digital asset (e.g., a number of Bitcoins) and conditions for accepting or transferring ownership/control of the digital asset. In some examples, a "spending transaction" refers to a blockchain transaction that reassociates (e.g., transferring ownership or control) at least a portion of a digital asset, indicated by an unspent transaction output (UTXO) of a previous transaction, to an entity associated with a blockchain address. In some examples, a "previous transaction" refers to a blockchain transaction that contains the UTXO being referenced by the spending transaction. A transaction, such as a spending transaction, may also specify a change address, which is a blockchain address to which the UTXO of the transaction is assigned. In some cases, the change address may be set to be the owner of the assets being transferred, such that the owner receives any unspent transaction output. However, the change address may be set to direct ownership or control of the change elsewhere.

In some embodiments, the transaction includes a "locking script" that encumbers the transaction with conditions that must be fulfilled before ownership/control can be transferred ("unlocked").

In some embodiments, the blockchain address is a string of alphanumeric characters that is associated with an entity to which control of at least a portion of a digital asset is being transferred or reassociated. In some blockchain protocols implemented in some embodiments, there is a one-to-one correspondence between a public key associated with the entity and the blockchain address. In some embodiments, validation of transactions involves validating one or more conditions specified in a locking script and/or unlocking script. Upon successful validation of the transaction 104, the validation node adds the transaction 104 to the blockchain and distributes it to the nodes 102.

Figure 2:
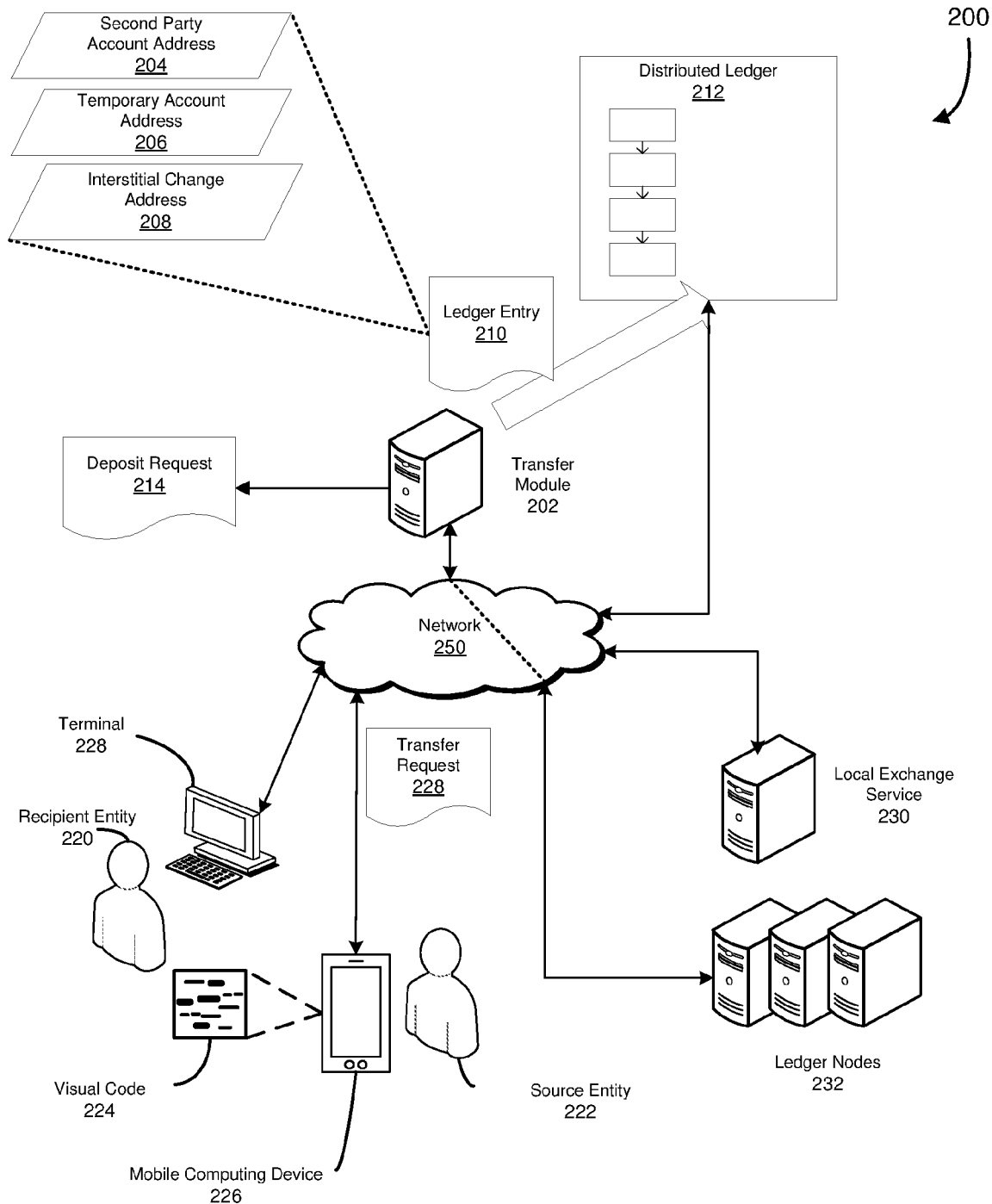
FIG. 2 illustrates a system for facilitating a transfer of assets between source and recipient parties.

FIG. 2 illustrates a system 200 for facilitating a transfer of assets between source and recipient parties. For example, the example embodiment illustrated by FIG. 2 may be employed to facilitate a transfer of assets in which a recipient entity 220 (e.g., a merchant) is paid for a product or service in fiat currency, based on digital assets held by the source entity 222 (e.g., the merchant's customer). It will be appreciated that this example is intended to be illustrative, and as such should not be construed in a manner which would limit the scope of the present disclosure to only those embodiments conforming to the specific example provided.

The example system 200 may comprise a transfer module 202 which performs operations to facilitate the transfer of assets from the source entity 222 to the recipient entity 220, using a distributed ledger 212. In an embodiment, the transfer module 202 comprises a computing device, such as a computing device in which a non-transitory memory of the computing device has stored thereon processor-executable instructions that, in response to being executed by the processor, cause the computing device to perform the functions of the transfer module 202 that are described herein.

In the example embodiment depicted by FIG. 2, the transfer module 202 generates a unique identifier to represent the recipient entity 220 and stores a record of the association between the unique identifier and the recipient entity. This unique identifier can be represented as a visual code 224 and provided to the recipient entity in printed or electronic form. The visual code 224 can be a barcode, quick-response ("QR") code, or other visual mark. The recipient entity can display the visual code 224 to prospective source parties. For example, a merchant may be provided with a visual code 224 in the form of a sign, poster, or other printed element, which the merchant can then display to prospective customers.

The source entity 222 may observe the visual code 224 and use a mobile computing device 226 to scan the visual code 224. In this manner, the source entity's mobile computing device 226 gains access to the recipient entity's unique identifier. An application running on the mobile computing device 226 can then send a transfer request 228 to the transfer module 202, via the network 250. In the example of FIG. 2, the transfer involves a series of operations in which the source entity contributes assets of a first type (specifically, digital assets associated with the distributed ledger 212) and the recipient entity receives assets of a second type, such as a fiat currency.

In another embodiment, the mobile computing device 226 sends an electronic message to a terminal 228, such as a point-of-sale device, operated by the recipient entity. The terminal 228 then may send the transfer request 228 to the transfer module.

In another embodiment, the terminal 228 sends the transfer request 228 directly to the transfer module 202. In this case, the terminal 228 acquires information about the source entity 222 through any of several possible means, such as direct inquiry or interchange with the source entity's 222 mobile computing device 226.

The transfer request 228 comprises the identifier of the recipient entity and an amount for the transfer, specified according to the destination asset type, i.e. the asset type requested by the recipient entity. For example, the amount may be specified as units of a fiat currency.

In response to receiving the transfer request 228, the transfer module 202 creates a temporary distributed ledger account that is associated with the recipient entity 220. In an embodiment, creating the account comprises forming a public/private key pair and a corresponding blockchain address. This blockchain address can be used to represent the temporary account in subsequent digital asset transfers. In some cases, a temporary blockchain address is also generated to use as an interstitial change address.

In an embodiment, the transfer module 202 obtains a conversion factor usable to convert between the source and destination asset types. In embodiments, the conversion factor is based on information obtained from a local exchange service 130 and represents current rates of exchange between the source and destination asset types. In embodiments, the conversion factor is obtained within a threshold amount of time, such that it may be considered to have been obtained contemporaneously with the initiation of the transaction. This may have technical effects including, but not limited to, minimizing risk to the source entity 222 to the transaction, minimizing risk to the transfer module 202, and allowing the source entity 222 to have greater insight into the cost of the transaction.

A local exchange service 230, as used herein, is a computer-accessible service reached through a network 250, such as the Internet. The service may provide a programming interface, protocol, or other similar mechanism for performing functions including providing a rate of conversion between asset types, and a programming interface, protocol, or other similar mechanism for conducting an exchange of those asset types. The asset types will include a digital asset tied to the distributed ledger 212.

In an embodiment, the local exchange service 230 is jurisdictionally proximate to at least one of the source entity 222 or the recipient entity 220. As used herein, jurisdictional proximity refers to the local exchange service 230 operating in the same country or economic zone as the source or recipient transaction entity 220.

In an embodiment, the local exchange service 230 is geographically proximate at least one of the source entity 222 or the recipient entity 220. As used herein, geographic proximity refers to the local exchange 230 being within the same geographic boundary as the first transaction entity 220.

In an embodiment, the local exchange service 230 is neither geographically nor jurisdictionally proximate to either the source entity 222 or recipient entity 220, but still operates in a manner relevant to the jurisdiction and/or geography of at least one of the parties. For example, a world-wide exchange might perform exchanges between the digital assets and a variety of other asset types, such as an asset type used in a jurisdiction and/or geography associated with the source and/or recipient entity.

In the example of FIG. 2, the transfer module 202 selects the local exchange service 230 from among a plurality of local exchange services based on a criteria set. The criteria may include conformance to jurisdictional or geographic factors noted above, and may also include other factors such as availability, latency, accuracy, and so forth. In an example, the recipient entity 220 provides an indication of a desired asset type, typically one associated with the jurisdiction of the recipient entity 2220. Thus, if the recipient entity 220 were a merchant, the local exchange service 230 can be selected based on the ability of the local exchange service 230 to provide the merchant's local fiat currency in exchange for the digital assets associated with the distributed ledger 212.

The transfer module 202 processes a distributed ledger transaction which transfers digital assets from an account associated with the source entity 222 to the temporary account. Using the distributed ledger provides technical advantages including, but not limited to, enabling the transfer module 202 to determine when to authorize a payment or other transfer to the recipient entity.

The amount of the ledger transaction is based on the amount specified in the transfer request 228 and on the conversion factor obtained from the local exchange service 230. Thus, the amount of the destination asset, as specified in the transfer request 228, is converted to an amount of digital assets using the conversion factor. The amount of the ledger transaction corresponds to this amount, although it may be adjusted based on factors such as a fee or commission.

The transfer module 202 specifies that an interstitial change address be used in the ledger entry 210. The interstitial change address may be a generated blockchain address used a single time. The use of an interstitial change address provides technical advantages, including but not necessarily limited to enabling efficient authorization of the requested transaction, enabling the provision of detailed transaction information, and avoiding the exposure of either entity's transaction history to the public blockchain.

In an embodiment, the ledger entry 210 comprises a temporary blockchain address used as a destination for the transfer and as an interstitial change address.

In an embodiment, the ledger entry 210 comprises a first temporary blockchain address used as a destination for the transfer, and a second temporary blockchain address used as an interstitial change address.

In an embodiment, the ledger entry 210 is entered by the transfer module 202 acting as a ledger node 232 that publishes (i.e., streams or broadcasts) transactions to other ledger nodes 232.

The transfer module 202 may process the distributed ledger transaction by submitting an entry to the distributed ledger. The ledger entry 210 is indicative of a transfer of digital assets. In particular, the entry may comprise a source indicator set to a blockchain address for an account held by the second entity to the transaction, a destination indicator set to a blockchain address for the temporary account, and a change address set to an interstitial change address.

The transfer module 202 may determine that the ledger entry 210 has been recorded in the distributed ledger 212. In various embodiments, an entry is considered to be recorded in the distributed leger when one or more ledger nodes 232 have received and stored copies of the entry.

In response to determining that the entry has been recorded, the transfer module 202 may initiate an exchange of digital assets for the other asset type. This comprises a transfer of digital assets from the temporary digital asset account to the digital asset account of an exchange. The exchange may then remit payment in the destination asset type. In the example of FIG. 2, the digital assets previously transferred from the source entity's account to the temporary account are then transferred to a digital asset account associated with the local exchange service 230. In response, the local exchange service 230 deposits a corresponding amount of destination assets into an account owned by the transfer module.

Also in response to determining that the ledger transaction has been recorded, the transfer module may initiate a deposit of destination assets to the recipient entity's account. The amount of the deposit generally corresponds to the amount of destination currency indicated in the transaction request 228, but may be adjusted based on various other factors including, but not necessarily limited to, service fees, commissions, taxes, and so forth.

In an embodiment, the transfer module 202 sends a notification to a terminal 228. The terminal 228 may, for example, be a point-of-sale system used by the recipient entity 220. This example should not, however, be viewed as limiting the scope of the present disclosure to only those embodiments that conform to this example.

Figure 3:
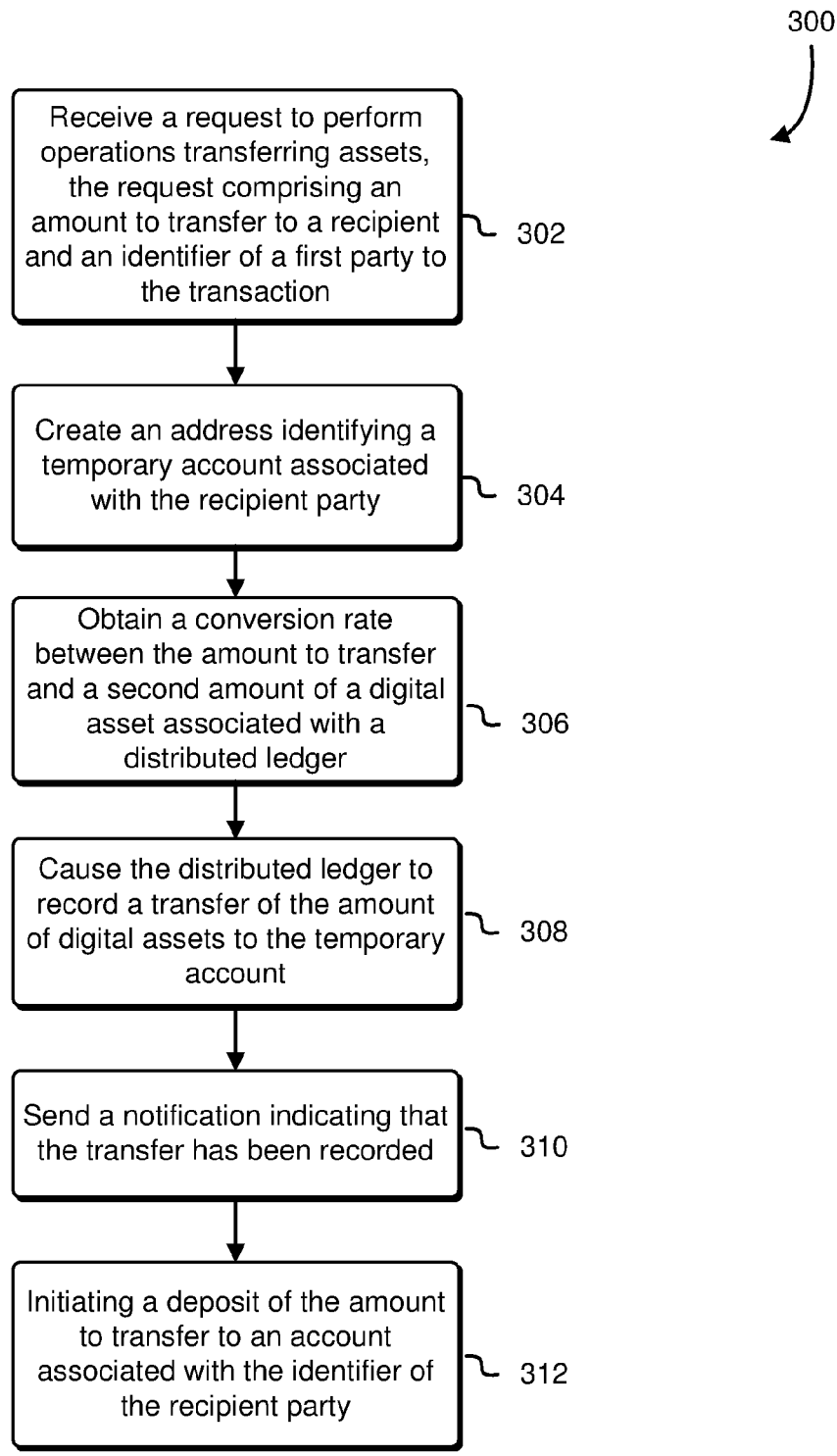
FIG. 3 illustrates an example process for facilitating a transfer of assets between source and recipient parties.

FIG. 3 illustrates an example process 300 for facilitating a transfer of assets between source and recipient parties. Although depicted as a sequence of operations, the depicted sequence should not be construed, except where explicitly stated or logically required (for example, where the outputs of one operation are used as inputs to another), as limiting the scope of the present disclosure to only those embodiments which conform to the depicted sequence. In particular, in various embodiments, certain steps may be omitted, re-ordered, or performed in parallel.

The operations of the example process 300 may be practiced by a transfer module, such as the transfer module 202 that is illustrated by FIG. 2. The operations may also be performed in a variety of contexts. In one example, the process may be employed to allow a merchant to receive payment in fiat currency based on digital currency held by a customer. In another context, an exchange between digital asset types is effectuated.

As used with respect to FIG. 3, an entity correspond to a person, party, device, or system associated with digital or non-digital asset types.

At 302, a transfer module receives a request to transfer assets. The received request comprises an amount to transfer to a recipient entity and an identifier of the recipient entity. As explained regarding the example of FIG. 2, the request may be initiated in a variety of ways, including the source entity using a mobile device to scan a visually encoded recipient identifier, and using an application on the mobile device to send the request.

At 304, the transfer module responds to the request by creating a blockchain address which identifies a temporary account. The account and blockchain address refer to the distributed ledger 212, and as such may be used to indicate the source or destination of digital asset transfers linked to the distributed ledger 212.

At 306, the transfer module obtains a conversion rate between the amount to transfer to the recipient and an amount of a digital asset associated with a distributed ledger. For example, the cryptocurrency Bitcoin is related to the digital ledger sometimes referred to as "blockchain," although the term blockchain may also be used more generally to refer to distributed ledgers used in relation to other digital asset types. The conversion rate may be obtained, in various embodiments, from a local exchange service that is selected contemporaneously with other operations related to the transfer.

At 308, the transfer module initiates a transfer of the determined quantity of digital assets to the temporary account. This causes a record of the transaction to be recorded by the distributed ledger. For example, the transfer module 202 depicted in FIG. 2 might use an application programming interface or web service to initiate a distributed ledger transaction. In response, one or more of the distributed ledger nodes 232 process the transaction by at least storing a record of the transaction in the distributed ledger.

In an embodiment, the entry specifies a source entity address as the source of the transfer, the temporary account address as the destination, and an interstitial change address as the change address of the transaction.

At 310, the transfer module sends a notification indicated that the transfer has been successfully recorded. In order to determine that the transfer has been successfully recorded, the transfer module may, for example, self-publish the blockchain transaction by acting as or interfacing with a distributed ledger node. In another embodiment, the transfer module determines that the transfer has been successfully recorded by identifying entries in the distributed ledger directed to the interstitial change address.

At 312, the transfer module initiates a deposit to an account associated with the identifier of the recipient entity. This operation may, in some cases and embodiments, be preceded by or contemporaneous with the transfer module initiating an exchange between the digital assets and the asset type used by the recipient. Performing this exchange helps reduce volatility risk associated with the digital asset and/or volatility associated with the recipient's asset type.

To initiate the deposit, the transfer module may send electronic messaged, such as the deposit request 214 illustrated by FIG. 2, to another system. For example, the deposit request 214 may be directed to a banking institution associated with the recipient entity, in applications that involve fiat currency.

Figure 4:
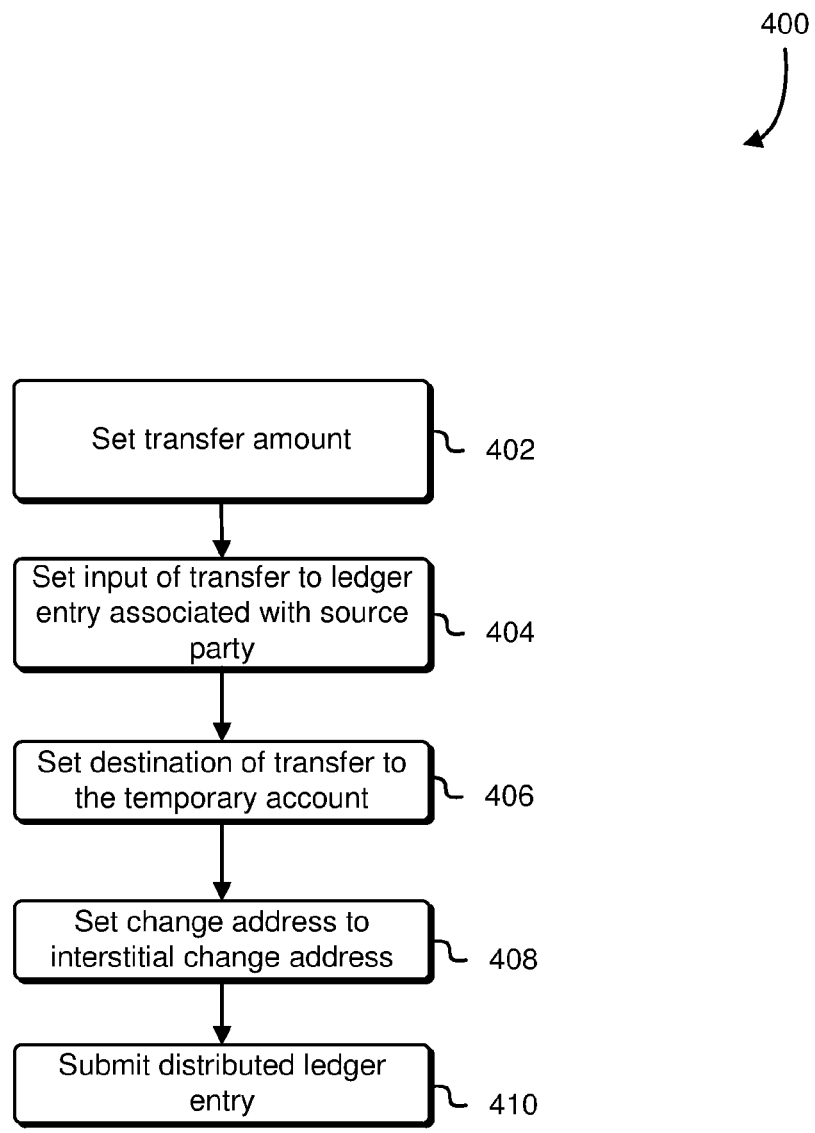
FIG. 4 illustrates an example process for recording a transaction in a distributed ledger.

FIG. 4 illustrates an example process 400 for recording a transaction in a distributed ledger. Although depicted as a sequence of operations, the depicted sequence should not be construed, except where explicitly stated or logically required (for example, where the outputs of one operation are used as inputs to another), as limiting the scope of the present disclosure to only those embodiments which conform to the depicted sequence. In particular, in various embodiments, certain steps may be omitted, re-ordered, or performed in parallel.

The operations of the example process 400 may be performed by a transfer module, such as the transfer module 202 that is illustrated by FIG. 1. The example process 400 relates to the causing the recordation of a distributed ledger entry, as illustrated by operation 308 in FIG. 3.

At 402, the transfer module sets the transfer amount for the distributed ledger entry. As explained regarding FIG. 3, the amount is denominated in terms of a digital asset linked to the distributed ledger in which the entry is being recorded. The amount of the transfer is based on the amount of the recipient asset that is being transferred, and a conversion rate obtained from a selected local exchange service.

At 404, the transfer module sets the input of the transfer to be a ledger entry associated with the source entity. While the source entity's digital assets might be described as being held in the source entity's digital asset account, they are represented in the distributed ledger as one or more transfers to the source entity that have not yet been transferred elsewhere. The transfer module locates an unspent entry and uses it as the input to the transfer that is to be recorded in the distributed ledger.

At 406, the transfer module sets the destination of the transfer to be an address associated with the temporary account created by the transfer module. The entry therefore indicates that the output of the transfer, less any change, should be assigned to the temporary account.

At 408, the transfer module sets the change address to be an interstitial change address. The ledger entry will therefore indicate that any funds beyond the specified amount should be assigned to the specified interstitial change address.

At 410, the transfer module submits the distributed ledger entry for recordation in the distributed ledger. The recordation of the ledger entry transfers the digital assets to the temporary account. Moreover, additional entries assigning the change to the interstitial change address are also entered into the distributed ledger.

Figure 5:
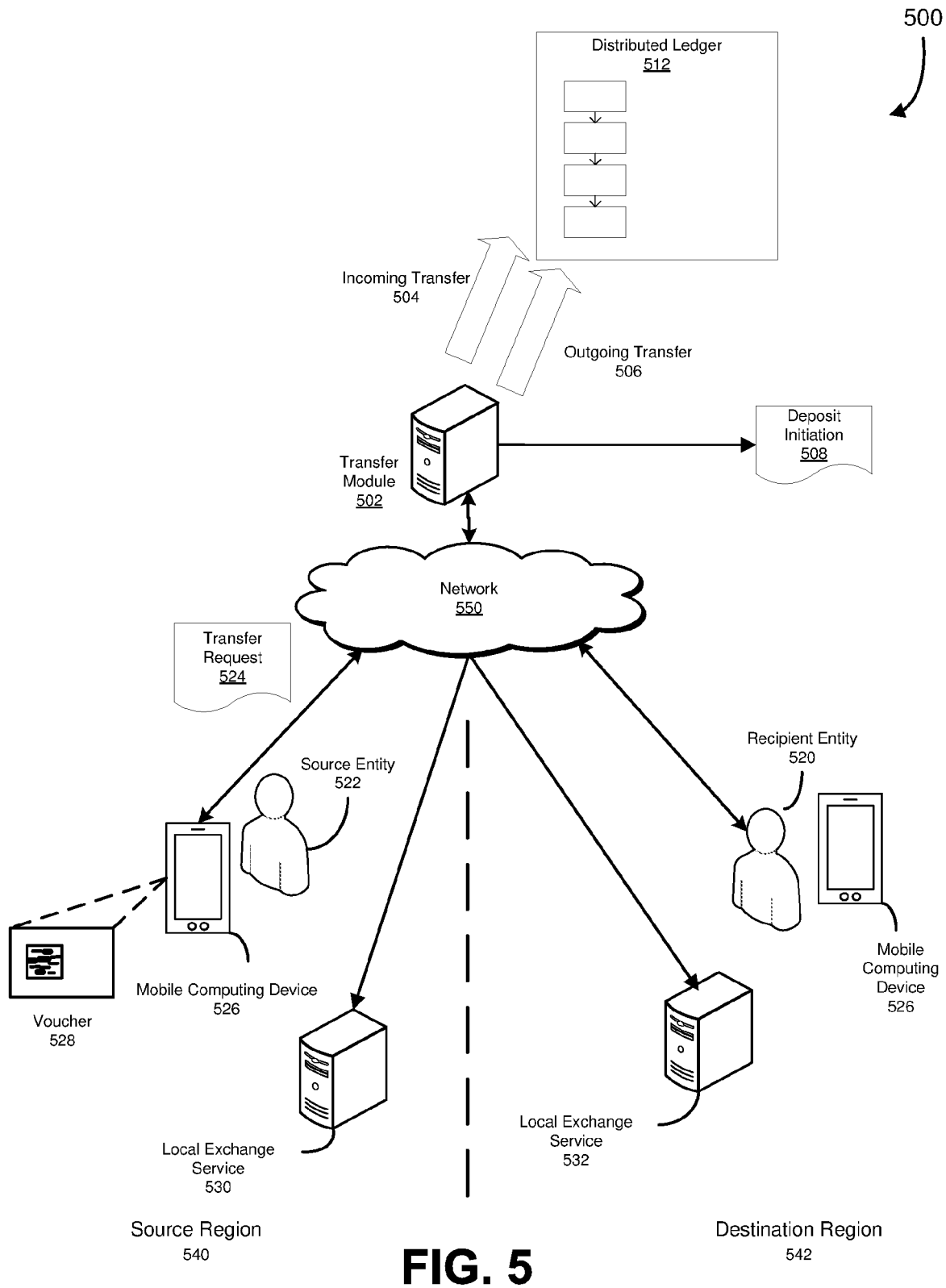
FIG. 5 illustrates a system for facilitating an asset transfer between source and recipient parties in different jurisdictions.

FIG. 5 illustrates a system for facilitating an asset transfer between source and recipient parties in different jurisdictions. For example, using the system 500 illustrated in FIG. 5, a source entity 522 may remit currency to a recipient entity 520 in another country, via a remittance facilitator 502 which utilizes a distributed ledger 512.

The example system 500 may comprise a transfer module 502 which performs operations to facilitate the transfer of assets from the source entity 522 to the recipient entity 520, using a distributed ledger 512. In an embodiment, the transfer module 502 comprises a computing device, such as a computing device in which a non-transitory memory of the computing device has stored thereon processor-executable instructions that, in response to being executed by the processor, cause the computing device to perform the functions of the transfer module 502 that are described herein.

In various cases and embodiments, the source entity 522 scans a voucher 528 using a mobile computing device 526. The voucher 528 may have been obtained from a merchant or other source in exchange for a fiat currency amount corresponding to the amount the source entity intends to transfer, adjusted to reflect any fees, commissions, or other costs.

The voucher 528 may be a printed coupon or other physical document, or may be an electronic document or message that can be visually displayed. The voucher 528 may include a visual code such as a barcode, quick-response ("QR") code, or other visual mark that can be scanned by the mobile computing device 526. Alternatively, the voucher 528 may include non-visual means of encoding information, such as a magnetic strip or radio-frequency id ("RFID"), which can be read by the mobile computing device 526. The mobile computing device 526 thereby obtains a voucher identifier. The voucher identifier comprises data uniquely identifying the voucher.

The mobile computing device 526 of the source entity 522 may transmit a transfer request 524 to the transfer module 502. In an embodiment, the transfer request 524 comprises the voucher identifier. A one-time PIN or cryptographic key may also be included and used to validate the source entity's authorization to use the voucher.

In an alternative embodiment, the transfer request 524 comprises account access and authorization information, and an amount to transfer. This information may therefore be used, in some embodiments, in place of the voucher identifier, to establish the terms of the requested transfer.

The transfer module 502 may validate the transfer request 524 by confirming that the voucher identifier corresponds to an authentic and unexpired voucher. In some cases, the validating also comprises determining that the amount of the requested transfer is consistent with an amount associated with the voucher.

Alternatively the transfer module 502 may validate the transfer request 524 by authenticating the provided account credentials and determining that the amount of the requested transfer is consistent with an available balance in an the account, or simply determine an amount for the voucher that is stored by the system.

In response to validating the request, the transfer module 502 obtains a conversion factor for exchanges between a source asset type and a digital asset tied to the distributed ledger 512. The conversion factor may be obtained from a local exchange service 530. Techniques for selecting the local exchange service may be similar to those described with respect to the selection of the local exchange service 230 depicted in FIG. 2.

The transfer module 502 then acquires digital assets in an amount proportional to the requested transfer amount, adjusted by the conversion factor. The acquisition may be performed via electronic communication with the local exchange service 530 in the source region 540. The acquisition is performed by exchanging the specified amount of the source asset for digital assets, adjusted by the conversion factor of the local exchange service 530.

The transfer module 502 also sells a corresponding amount of digital assets. The sale may be performed via electronic communication with the local exchange service 532 in the destination region 542. In various cases and embodiments, the acquisition of digital assets is performed contemporaneously with the sale of digital assets. For example, the sale may be performed immediately subsequent to the successful acquisition of the digital assets. The sale may be performed by exchanging the digital assets for destination assets, adjusted by a conversion factor provided by the local exchange service 532 in the destination region 542.

The transfer module 504 may, in some embodiments, transfer the digital assets from the source region 540 to the destination region 542 prior to the sale. In particular, assets acquired by an account associated with the source region 540 may be transferred to an account associated with the destination region 532. The sale of digital assets may then be based on digital assets held by the destination region account.

The acquisition of the digital assets is recorded in the distributed ledger as 512 as an incoming transfer 504 of digital assets. Here, "incoming" refers to the digital assets being transferred to an account associated with the transfer module 502. The incoming transfer 504 may be recorded in the distributed ledger 512 by initiating a ledger transaction in which the destination address of the transfer corresponds to the transfer module's 502 account.

The sale of the digital assets may similarly be record in the distributed ledger 512 as an outgoing transfer 506 of digital assets. Here, "outgoing" refers to the digital assets being transferred from an account held by the transfer module 502. The outgoing transfer 506 may be recorded in the distributed ledger 512 by initiating a ledger transaction in which the source address of the transfer is indicated to be an address of the transfer module's 512 account. In some cases, the destination address is that of a selected local exchange service 532 in the destination region 542.

The incoming transfer 504 and outgoing transfer 506 may be effectuated by respective local exchange services 530, 532. The incoming transfer 504 may be effectuated by a local exchange service 530 in the source region 540, and the outgoing transfer 506 may be effectuated by a local exchange service 532 in the destination region 542. In the example of FIG. 5, the transfer module 502 selects the local exchange services 530, 532 from among a plurality of local exchange services based on a criteria set. The criteria may include conformance to jurisdictional or geographic factors, and availability, latency, and cost of the selected exchanges 530, 532. The local exchange services may be selected contemporaneously with other operations, e.g. in response to the transfer module 502 receiving the transfer request 524.

In an embodiment, the transfer module 502 uses proceeds from the sale of the digital assets to acquire second-region assets and provide those assets to the recipient entity. In an embodiment, the second-region assets are converted to mobile money and deposited into a mobile money account accessible to the recipient entity 520 using a mobile computing device 526. For example, the second-region assets may be fiat currency for the jurisdiction of the destination region 542. The transfer module 502 may use the fiat currency funds to purchase a corresponding amount of mobile money on behalf of the recipient entity 520. The recipient entity may then use those funds to purchase goods and services. As used herein, mobile money refers to assets, typically denominated in a fiat currency, which are made accessible to the user of a mobile device. A mobile money account refers to a service for tracking the availability of a user's mobile money.

Figure 6:
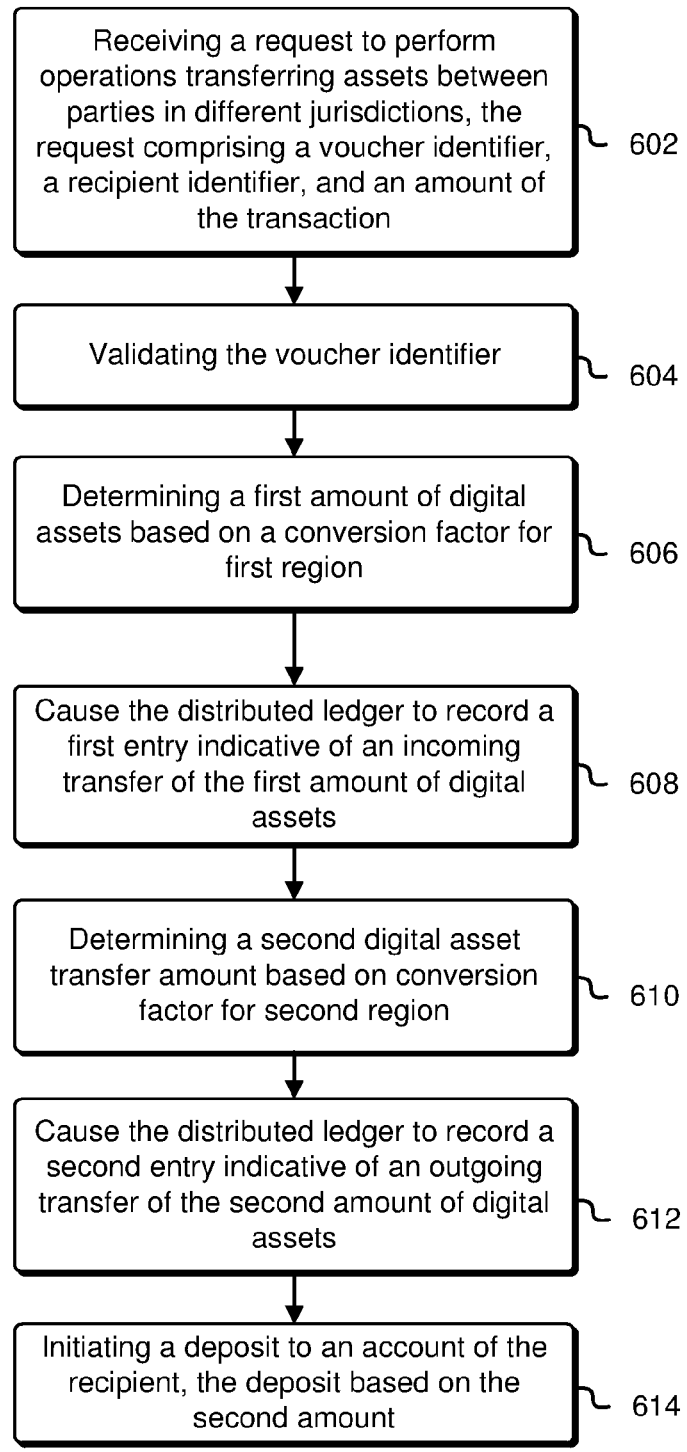
FIG. 6 illustrates an example process for facilitating an asset transfer between source and recipient parties in different jurisdictions.

FIG. 6 illustrates an example process for facilitating an asset transfer between source and recipient parties in different jurisdictions. Although depicted as a sequence of operations, the depicted sequence should not be construed, except where explicitly stated or logically required (for example, where the outputs of one operation are used as inputs to another), as limiting the scope of the present disclosure to only those embodiments which conform to the depicted sequence. In particular, in various embodiments, certain steps may be omitted, re-ordered, or performed in parallel.

At 602, the transfer module receives a request transfer assets between parties in different jurisdictions. The requested transfer may therefore involve the exchange of assets of different types. For example, a source entity might wish to transfer assets held in a local currency to another entity, converting the local currency to another asset type usable to the receiving entity.

The request received by the transfer module may comprise an identifier of a voucher, an identifier of a recipient entity, and an amount to transfer. The amount may be specified according to either the source or destination asset type. For example, the amount might correspond to an amount of fiat currency used to purchase the voucher from a merchant. The voucher may contain a visual mark encoding an identifier, which can be scanned and sent to the transfer module in the request to initiate the transfer.

At 604, the transfer module validates the voucher identifier. In an embodiment, this comprises identifying records associating the voucher identifier with other data that includes an amount associated with the voucher, and a record of how much of that amount has already been utilized. The transfer module may, for example, retrieve a database record index by the voucher identifier and containing the aforementioned information.

At 606, the transfer module determines a first amount of digital assets based on a conversion factor for the source region. With reference to FIG. 5, embodiments may obtain the conversion factor by selecting a local exchange service 530 in the source region 540, and then utilizing the local exchange service 530 to obtain the conversion factor. The use of a dynamically and contemporaneously selected local exchange service may have various advantages, including a reduction of exchange volatility risk.

At 608, the transfer module causes the recordation of a distributed ledger entry that is indicative of an incoming transfer of the first amount of digital assets. The entry thus reassigns assets held by the source entity to another account owned by the transfer module. The transfer module, in an embodiment, performs this step through an intermediary, such as the local exchange service 530. For example, the transfer module may transmit a request to the local exchange service 530 for the first amount of digital assets, in exchange for which the transfer module remits a corresponding amount of the source asset.

At 610, the transfer module determines a second digital asset transfer amount based on a conversion factor for a second region. With reference to FIG. 5, embodiments may obtain the conversion factor by selecting a local exchange service 532 in the destination region 542. This selection may also be dynamic and contemporaneous with respect to other operations in the transfer, and may also reduce exchange volatility risk.

At 612, the transfer module causes the recordation of a distributed ledger entry that is indicative of an outgoing transfer of the second amount of digital assets. Embodiments may effectuate the recordation via an intermediary, such as the local exchange service 532 in the second region, and receive in exchange a corresponding amount of some other asset type.

At 614, the transfer module initiates a deposit to an account of the recipient, where the amount of the deposit is based on the second amount of digital assets. The amount may correspond to the proceeds from the outgoing transfer of digital assets, less any adjustments based on factors such as costs, fees, or commissions.

Embodiments of the present disclosure may convey various advantages, which may include one or more of the following. The described techniques (such as those described with respect to FIG. 3) may enable rapid authorization of dependent operations, such as the transfer of goods or services which may be dependent on the described operation set (e.g., the operations transferring an asset, as depicted in FIG. 3). This may be of particular importance to commercial transactions, such as those involving retailers, or other scenarios in which the dependent operation must be performed contemporaneously with an operation set. The described techniques may also facilitate the provision of detailed transactional and operational data to entities affected by an operation set. Further, the described techniques may prevent the exposure of the participating entities' transaction history on the public blockchain. The described techniques may also reduce exchange rate volatility by performing the relevant conversions contemporaneously with the other operations.

The described techniques (for example, those described with respect to FIG. 6) may leverage rapid completion of dependent transactions, such remittance of an exchanged asset type. In addition, the use of a voucher and a corresponding set of blockchain transactions allows delivery of value to a receiving entity, independently of traditional remittance mechanisms. The described technique also allows for near-immediate delivery of an asset to a receiving entity, more rapidly than is typically achievable through traditional remittance mechanisms.

The specification and drawings are to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising", "having", "including", and "containing" are to be construed as open-ended terms (i.e., meaning "including, but not limited to") unless otherwise noted. The term "connected", when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset", unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C", or "at least one of A, B and C", unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like do not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A computer-implemented method, comprising:
    receiving, by a transfer device on a blockchain network, a request to initiate a plurality of operations, the request comprising a first value and an identifier of a first entity, the plurality of operations comprising a blockchain transaction and a second transaction of a type different from the blockchain transaction;
    generating, by the transfer device, a blockchain address to be temporarily associated with the identifier in a data store to result in a temporary address of a temporary account of the first entity;
    obtaining, by the transfer device, from a service, a conversion factor to convert the first value to a second value to be used in the blockchain transaction;
    causing, by the transfer device, the blockchain transaction to be recorded in a blockchain, wherein the blockchain transaction uses the temporary address to record the second value to the temporary account and uses an interstitial change address to record an adjustment value;
    validating recordation of the blockchain transaction; and
    as a result of the recordation having been validated, causing the second transaction to be processed based at least in part on the first value by initiating, by the transfer device, a transfer of the second value from the temporary account to a destination account associated with the first entity.

2. The computer-implemented method claimed according to claim 1, further comprising sending, as a result of the recordation of the blockchain transaction having been validated, a notification that a third transaction may proceed.

3. The computer-implemented method according to claim 1, wherein the identifier of the first entity is obtained from a visual code scanned by a device controlled by a second entity.

4. The computer-implemented method according to claim 1, wherein the request is transmitted from a point-of-sale device controlled by the first entity.

5. The computer-implemented method according to claim 1, wherein the request is transmitted from a point-of-sale device controlled by the first entity in response to an electronic communication from a device controlled by a second entity.

6. The computer-implemented method according to claim 1, wherein validating the recordation of the blockchain transaction comprises identifying an additional blockchain transaction assigning change from the blockchain transaction to the interstitial change address.

7. The computer-implemented method according to claim 1, further comprising publishing the blockchain transaction, wherein the validating the recordation of the blockchain transaction comprises completion of the publishing.

8. The computer-implemented method according to claim 1, wherein temporary address is not used in a blockchain transaction subsequent to performing the plurality of operations.

9. The computer-implemented method according to claim 1, wherein the plurality of operations comprises an additional blockchain transaction transferring a digital asset from the temporary address to an address provided by the service.

10. The computer-implemented method according to claim 1, further comprising selecting, by the transfer device, the service, from among a plurality of services, based at least in part on the service conforming to at least one of jurisdictional or geographic criteria.

11. A system, comprising:
at least one processor; and
memory including executable instructions that, as a result of execution by the at least one processor, causes the system to perform the computer-implemented method of claim 1.

12. A non-transitory computer-readable storage medium having stored thereon executable instructions that, as a result of being executed by a processor of a computer system, cause the computer system to at least perform the computer-implemented method of claim 1.

13. A computer-implemented method, comprising:
receiving, by a transfer device on a blockchain network, a request to initiate a plurality of operations, the request comprising information indicative of a first value and an identifier of a first entity, the plurality of operations comprising a first blockchain transaction, a second blockchain transaction, and a third transaction of a type different from the first and second blockchain transactions;
obtaining, by the transfer device, a first conversion factor from a first service associated with a first region;
causing, by the transfer device, the first blockchain transaction to be recorded in a blockchain, wherein the first blockchain transaction is indicative of an incoming transfer of an amount of digital assets based at least in part on the first value and the first conversion factor;
obtaining, by the transfer device, a second conversion factor from a second service associated with a second region;
causing, by the transfer device, the second blockchain transaction to be recorded in the blockchain, wherein the second blockchain transaction is indicative of an outgoing transfer of the amount of digital assets, wherein the outgoing transfer is in exchange for a second amount of a second asset type, the second amount based at least in part on the amount of digital assets and the second conversion factor; and
initiating, by the transfer device, the third transaction based at least in part on the second amount of the second asset type, wherein the third transaction is a transfer to a destination account of the first entity.

14. The computer-implemented method according to claim 13, wherein the third transaction is initiated in response to confirming the first and second blockchain transactions in the blockchain, wherein the confirmation is made without determining that the first and second blockchain transactions are associated with a mined block in the blockchain.

15. The computer-implemented method according to claim 13, wherein the first blockchain transaction comprises a generated blockchain address, the generated blockchain address not used in a transaction after performing the plurality of operations.

16. The computer-implemented method according to claim 13, wherein the third transaction comprises transferring at least a portion of the second amount of the second asset type to a mobile currency account.

17. The computer-implemented method according to claim 13, further comprising selecting, by the transfer device, the first and second services based at least in part on conformance of the first and second services to at least one of a jurisdictional or a geographic criterion.

18. The computer-implemented method according to claim 13, wherein the information indicative of the first value comprises an identifier of a voucher.

19. A system, comprising:
at least one processor; and
memory including executable instructions that, as a result of execution by the at least one processor, causes the system to perform the computer-implemented method of claim 13.

20. A non-transitory computer-readable storage medium having stored thereon executable instructions that, as a result of being executed by a processor of a computer system, cause the computer system to at least perform the computer-implemented method of claim 13.

* * * * *